No. 753,826. PATENTED MAR. 1, 1904.
W. E. CORKREY.
TOOL FOR TRIMMING SCREW THREADS.
APPLICATION FILED JULY 29, 1903.
NO MODEL.
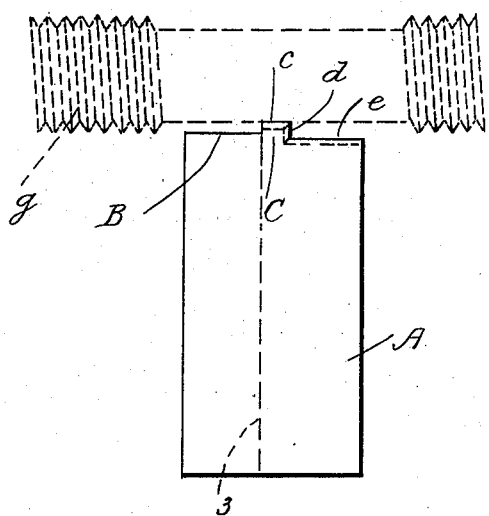
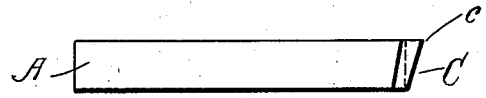
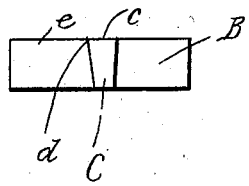

No. 753,826.　　　　　　　　　　　　　　　　　　　　　Patented March 1, 1904.

UNITED STATES PATENT OFFICE.

WILLIAM E. CORKREY, OF BRAINERD, MINNESOTA.

TOOL FOR TRIMMING SCREW-THREADS.

SPECIFICATION forming part of Letters Patent No. 753,826, dated March 1, 1904.

Application filed July 29, 1903. Serial No. 167,504. (No model.)

*To all whom it may concern:*

Be it known that I, WILLIAM E. CORKREY, a citizen of the United States, residing at Brainerd, in the county of Crow Wing and State of Minnesota, have invented certain new and useful Improvements in Tools for Trimming Screw-Threads; and I do hereby declare the following to be a full, clear, and exact description of the invention, such as will enable others skilled in the art to which it appertains to make and use the same.

This invention relates to tools for the removal of surplus metal from any round body, such as a screw-threaded stay-bolt for a boiler or any other round bolt or shaft, whether screw-threaded or not.

This invention consists in the novel cutting-tool hereinafter fully described and claimed.

In the drawings, Figure 1 is a plan view of the tool. Fig. 2 is a side view of the tool. Fig. 3 is a front view of the tool looking toward its edge.

A is the shank of the cutting-tool, which is formed of a rectangular piece of steel. This shank has a projection C at its middle part, which has a beveled cutting edge $c$ on its front edge and a beveled cutting edge $d$ on one of its side edges.

B is a gage-shoulder on the front edge of the shank on the opposite side of the projection C from the side cutting edge $d$. The part $e$ of the front edge of the shank on the same side of the shank as the side cutting edge $d$ is slightly in rear of the plane of the gage-shoulder B. This part $e$ is formed so as to clear the tops of the screw-threads of the bolt when the gage-shoulder B touches the tops of the said screw-threads, and it is preferably beveled, so as to enable a good cutting edge to be formed at $d$, it being necessary that at least a portion of the part $e$ be beveled in order to form the beveled cutting edge $d$ in a satisfactory manner. It is necessary to allow the plate A to extend at $e$ in order to give strength and stiffness to the projection C.

A portion of a stay-bolt $g$ is shown in dotted lines in the drawings. Stay-bolts are usually screw-threaded for their full length, and in order to make them lighter it is desirable to remove the screw-threads from their middle portions. The stay-bolt is revolved upon its axis in any approved manner, and the tool is held in any suitable support and is fed forward against the stay-bolt. The cutting edge $c$ cuts or trims away the screw-threads until the gage-shoulder B touches the tops of the screw-threads of the stay-bolt. The tool is then moved longitudinally along the stay-bolt and the surplus screw-threads are trimmed off by the side cutting edge $d$. Any approved lathe may be used, and the longitudinal movement of the tool may be effected by the usual feed-screw. A plurality of these tools may also be used and they may be arranged to operate simultaneously by securing them in any approved form of bolt-cutter die-head.

The dotted line 3 in Fig. 1 shows the junction of the gage with the cutting portion of the tool. The gage may be formed integral with the cutting part, or it may be welded to it, or it may be connected to it in any other approved manner.

When the tool is made of a single piece of steel, the gage-shoulder is ground back as the cutting edge $c$ wears away in use. When the tool is made in two pieces, the portion which forms the gage is slid back instead of being ground as the cutting edge $c$ wears away.

What I claim is—

A cutting-tool provided with a blunt gage or stop upon its forward end, the cutting portion projecting forwardly beyond the said stop and having a cutting edge upon its forward end and upon its side opposite the said stop.

In testimony whereof I affix my signature in presence of two witnesses.

WILLIAM E. CORKREY.

Witnesses:
W. N. PURDY,
W. H. MANTOR.